United States Patent
Emigh et al.

(10) Patent No.: US 9,021,560 B1
(45) Date of Patent: Apr. 28, 2015

(54) AUTHORIZATION VIA WEB OF SUBSEQUENT MESSAGE DELIVERY FROM A SPECIFIED SENDER

(71) Applicant: Radix Holdings, LLC, Incline Village, NV (US)

(72) Inventors: Aaron Emigh, Incline Village, NV (US); James Roskind, Redwood City, CA (US)

(73) Assignee: Radix Holdings, LLC, Incline Village, NV (US)

( * ) Notice: Subject to any disclaimer, the term of this patent is extended or adjusted under 35 U.S.C. 154(b) by 0 days.

(21) Appl. No.: 14/171,727

(22) Filed: Feb. 3, 2014

Related U.S. Application Data

(63) Continuation of application No. 10/915,213, filed on Aug. 9, 2004, now Pat. No. 8,645,697.

(60) Provisional application No. 60/493,991, filed on Aug. 8, 2003, provisional application No. 60/518,382, filed on Nov. 7, 2003, provisional application No. 60/524,107, filed on Nov. 22, 2003, provisional application No. 60/535,421, filed on Jan. 9, 2004, provisional application No. 60/543,832, filed on Feb. 10, 2004.

(51) Int. Cl.
  *G06F 21/00* (2013.01)
  *H04L 29/06* (2006.01)

(52) U.S. Cl.
  CPC ............ *H04L 63/08* (2013.01); *H04L 63/0227* (2013.01)

(58) Field of Classification Search
  CPC .................................................. H04L 63/0227
  See application file for complete search history.

(56) References Cited

U.S. PATENT DOCUMENTS

| | | | |
|---|---|---|---|
| 6,266,692 B1 * | 7/2001 | Greenstein | 709/206 |
| 6,356,937 B1 * | 3/2002 | Montville et al. | 709/206 |
| 6,421,709 B1 * | 7/2002 | McCormick et al. | 709/206 |
| 6,546,416 B1 * | 4/2003 | Kirsch | 709/206 |
| 7,096,498 B2 * | 8/2006 | Judge | 726/22 |
| 7,590,695 B2 * | 9/2009 | Landsman et al. | 709/206 |
| 7,620,691 B1 * | 11/2009 | Goldman et al. | 709/206 |
| 7,996,471 B2 * | 8/2011 | Malik | 709/206 |
| 2003/0009698 A1 * | 1/2003 | Lindeman et al. | 713/201 |
| 2004/0181581 A1 * | 9/2004 | Kosco | 709/206 |
| 2005/0021649 A1 * | 1/2005 | Goodman et al. | 709/207 |
| 2005/0198511 A1 * | 9/2005 | Tomkow | 713/176 |

* cited by examiner

*Primary Examiner* — Morshed Mehedi

(57) ABSTRACT

In some embodiments, techniques for authorizing a message comprise receiving a request to authorize delivery of a message for a recipient to be sent subsequent to the request, by a specified sender, wherein the request is embedded in a web page associated with the specified sender; determining whether the request is valid; updating information associated with the specified sender to indicate that the specified sender is authorized, when it is determined that the request is valid; receiving an incoming message for the message recipient; determining that the specified sender is a sender of the incoming message; determining whether the specified sender is authorized, wherein determining whether the specified sender is authorized includes checking the information associated with the specified sender; and when it is determined that the second sender is authorized, bypassing spam filtering for the incoming message and delivering the incoming message.

20 Claims, 16 Drawing Sheets

AUTHORIZATION VIA WEB OF SUBSEQUENT MESSAGE DELIVERY FROM A SPECIFIED SENDER

CROSS REFERENCE TO RELATED APPLICATIONS

This application claims priority to co-pending U.S. patent application Ser. No. 10/915,213 entitled MESSAGE AUTHORIZATION filed Aug. 9, 2004, which is incorporated herein by reference for all purposes.

This application claims priority to U.S. Provisional Patent Application No. 60/493,991 entitled SYSTEM AND METHOD FOR AVOIDING SPAM filed Aug. 8, 2003, which is incorporated herein by reference for all purposes.

This application claims priority to U.S. Provisional Patent Application No. 60/518,382, entitled ELECTRONIC MESSAGING ENHANCEMENTS filed Nov. 7, 2003, which is incorporated herein by reference for all purposes.

This application claims priority to U.S. Provisional Patent Application No. 60/524,107 entitled ADDITIONAL MESSAGING ENHANCEMENTS, filed Nov. 22, 2003, which is incorporated herein by reference for all purposes.

This application claims priority to U.S. Provisional Patent Application No. 60/535,421 entitled IMPLICIT SPAM DETECTION, filed Jan. 9, 2004, which is incorporated herein by reference for all purposes.

This application claims priority to U.S. Provisional Patent Application No. 60/543,832 entitled POLICY-BASED FILTERING, filed Feb. 10, 2004, which is incorporated herein by reference for all purposes.

FIELD OF THE INVENTION

The present invention relates generally to the area of computer software, more specifically to the area of electronic messaging.

BACKGROUND OF THE INVENTION

Electronic communications such as email and instant messages are commonly used for personal and business communications. Unsolicited commercial electronic messages and other unwanted messages can inundate users. Such messages are commonly referred to as spam.

Commonly legitimate messages are incorrectly categorized as spam and rerouted to seldom-checked "junk mail" folders or simply not delivered. Such incorrect categorizations, known as "false positives," cause problems because users may not see such incorrectly categorized legitimate messages, and therefore are unable to read or respond to them.

Users often receive such legitimate messages in response to providing their messaging addresses, e.g. email addresses, via the web to a legitimate sender, anticipating that such a sender may subsequently send messages to their messaging address. Previously known techniques do not permit users to authorize message delivery when they provide consent to receive messages, and therefore such consented-to messages may be incorrectly categorized by a spam filter, even though the user has requested the communication.

It would be useful to have improved techniques for mitigating the adverse effects of spam, including the adverse effects of false positives from spam filtering.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a non-transitory computer readable medium such as a computer readable storage medium, or a computer network wherein program instructions are sent over optical or electronic communication links. In this specification, these implementations, or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
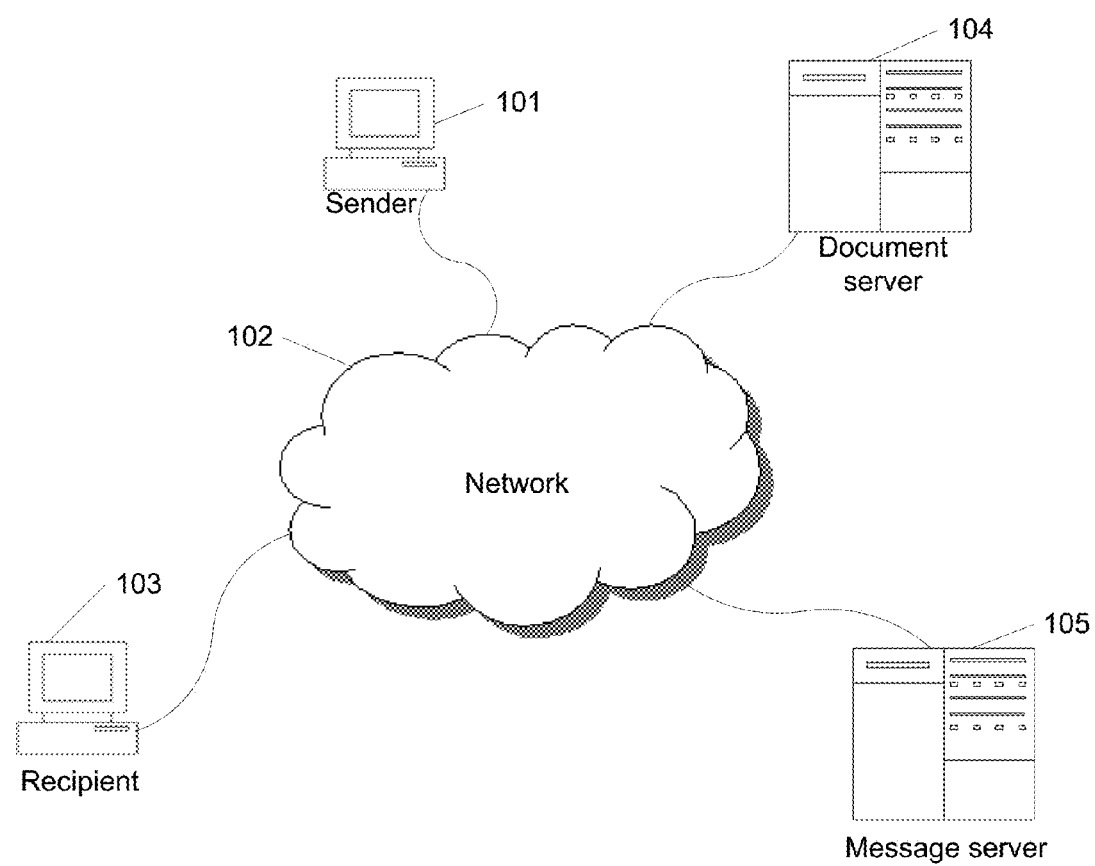
FIG. 1 is a diagram of a system for message filtering according to some embodiments.

FIG. 1 is a diagram of a system for message filtering according to some embodiments. In this example, a sender of a message 101 is connected to a network 102. A sender may be any device capable of sending a message, including a personal computer, PDA, or cell phone. A sender may also refer herein to a user of a device capable of sending a message, or a server receiving a message from a sender device. The network 102 may be any type of network, for example a public network such as the internet or a cellular phone network. In another example, the network may be an enterprise or home network, a virtual private network, or a wireless network such as an 802.11 or Bluetooth network. A recipient of a message 103 is connected to the network 102. A recipient may be any device capable of receiving a message, including a personal computer, PDA, or cell phone. A recipient may also refer herein to a user of a device capable of receiving a message, or a server transmitting a message to a recipient device.

A document server 104, such as a web server, may be connected to the network 102. The document server 104 may provide documents that may contain requests for authorization. A message server 105, such as a Mail Transfer Agent (MTA) or POP or IMAP server, is connected to the network 102. In some embodiments, a message server 105 and recipient 103 may be within an enterprise network such as a LAN or virtual private network.

Figure 2:
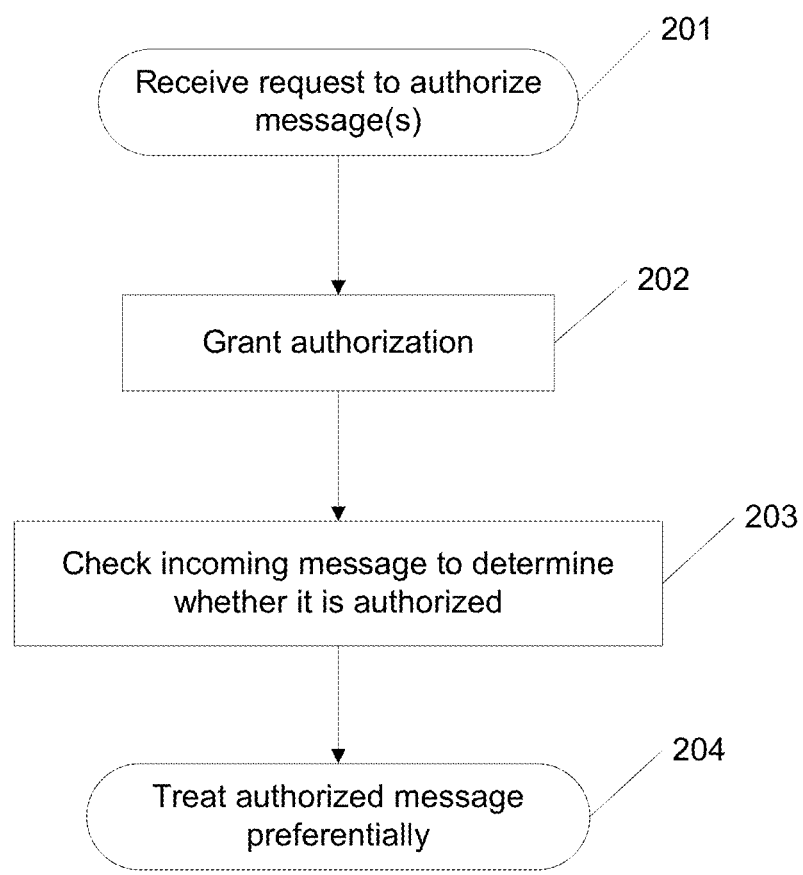
FIG. 2 is a flow diagram of a method for authorizing messages according to some embodiments.

FIG. 2 is a flow diagram of a method for authorizing messages according to some embodiments. A "message" refers herein to any electronic communication that may be presented to a user. Examples of messages include email, instant messages, SMS text messages, RSS, Atom, and Bluetooth messages. In this example, a request for authorization to send one or more messages is received (201). One example of requesting authorization is for a document such as a web page or message to embed a request for authorization to send one or more messages. In one example, a request may be made by a script such as a Javascript script or Java applet through a programmatic interface such as ActiveX or a plug-in. In another example, a computer program such as a browser may include the capability to request authorization in response to a request embedded within a document.

Authorization may be granted (202). In one example of granting authorization, an authorization request may be approved through a user interface element such as a dialog box. In another example of granting authorization, information provided by a requestor may be verified to determine whether authorization may be granted automatically. One example of verifying information is to check whether a provided messaging address is a valid messaging address for the recipient. Another example of verifying information is to confirm the validity of one or more authorization credentials presented by a requestor. An authorization credential refers herein to any credential that may be used to demonstrate authorization, for example a credential associated with a message. An example of an authorization credential is a cryptographically signed certificate certifying that the requestor is a trusted sender. Another example of an authorization credential is a token.

An incoming message may be checked to determine whether it is authorized (203). In some embodiments, an incoming message may be provided by a message server 105. One example of checking an incoming message is to determine whether its sender is on a list of authorized senders.

In some embodiments, checking whether a message is authorized may include checking whether a limit has been exceeded, for example a time limit or a limit on the number of permitted messages. In some embodiments, if a limit has been exceeded, a message may be considered unauthorized, or the sender may be removed from a list of authorized senders, or a user may be asked what action to take. Another example of checking an incoming message is to check a cryptographic signature and/or certificate incorporated in a message. One example of checking a signature is to determine that it is correctly signed, and that the signer is contained on a list of authorized senders. One example of checking a certificate is to determine that a certification chain contains a trusted certification authority. (A certificate may refer herein to a certificate and associated certificates in a certification chain leading from the certificate to a trusted certification authority.)

In some embodiments, a message server 105 of FIG. 1 may check an incoming message to determine whether it is authorized. In other embodiments, the recipient 103 of FIG. 1 may check an incoming message to determine whether it is authorized.

An authorized message may be treated preferentially with respect to unauthorized messages (204). In one example of preferential treatment, an authorized message may be delivered without spam filtering that may normally be applied to unauthorized messages. In another example of preferential delivery, an authorized message may be filtered by a spam filtering system with less stringent requirements than an unauthorized message.

Figure 3:
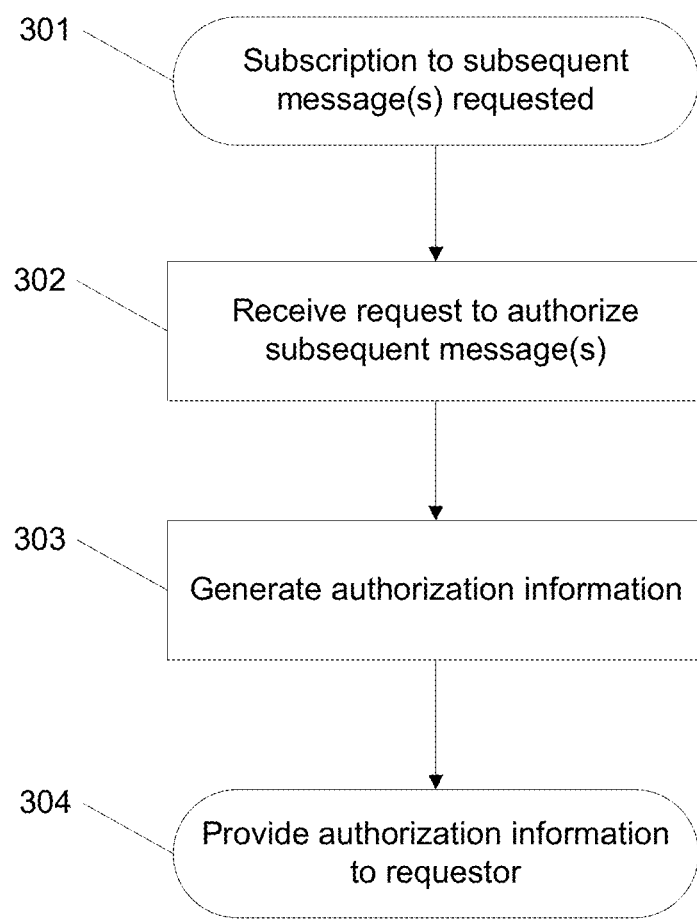
FIG. 3 is a flow diagram of a method for responding to message subscription requests according to some embodiments.

FIG. 3 is a flow diagram of a method for responding to message subscription requests according to some embodiments. In this example, a subscription to one or more subsequent messages is requested (301). A subscription refers herein to an authorization to receive one or more messages. An example of a request for a subscription is a user browsing a document such as a web page and signing up for electronic messages such as email. Examples of signing up for messages include subscribing to a mailing list, purchasing a product or service for which an invoice message will be sent, and signing up for a marketing promotion to receive messages.

A request for authorization may be received (302). One example of requesting authorization is for a document such as a web page or message to embed a request for authorization to send one or more messages. In one example, a request may be made by a script such as a Javascript script or Java applet through a programmatic interface such as ActiveX or a plug-in. In another example, a computer program such as a browser may include the capability to request authorization in response to a request embedded within a document. In some embodiments, an authorization request may contain an address such as a URL to which authorization may be sent.

Authorization information may be generated (303). Authorization information refers herein to any information that may be used to authorize a message, or determine whether a message is authorized. One example of generating authorization information is to generate a token or digital certificate which the requestor may use in subsequent communications. In some embodiments, a digital certificate may certify a key, for example a key provided by the requestor, for use in signing subsequent communications.

Authorization information may be provided to the requestor (304). One example of providing authorization information to the requestor is to pass the authorization information back to a program such as a script that has requested authorization, which may in turn transmit the authorization information back to the requestor. Another example of providing authorization information to the requestor is to transmit authorization information to an address such as a URL that was provided in an authorization request.

Figure 4:
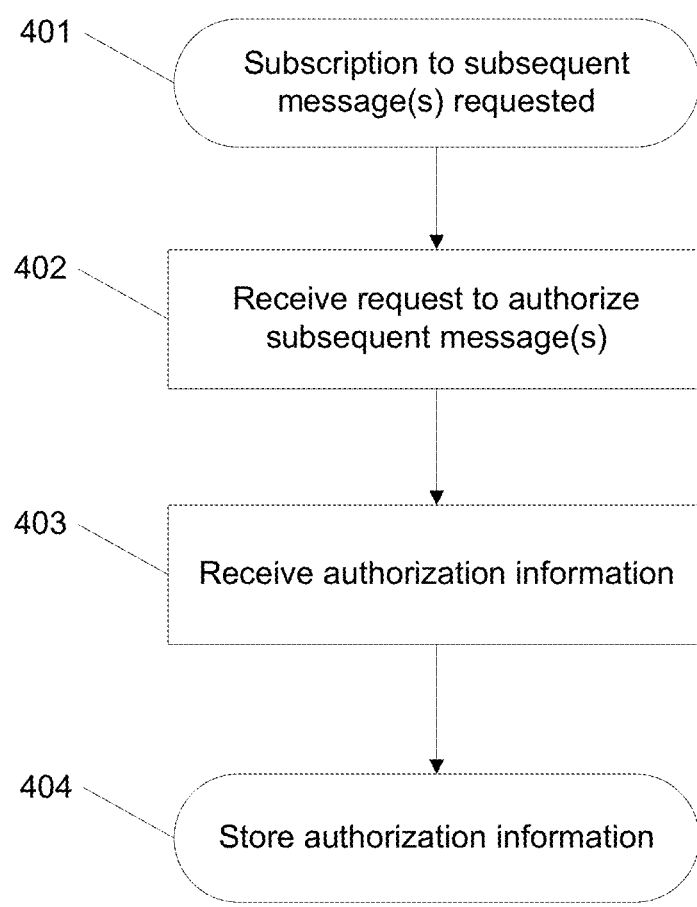
FIG. 4 is a flow diagram of a method for responding to message subscription requests according to some embodiments.

FIG. 4 is a flow diagram of a method for responding to message subscription requests according to some embodiments. In this example, a subscription to one or more subsequent messages is requested (401). A subscription refers herein to an authorization to receive one or more messages. An example of a request for a subscription is a user browsing a document such as a web page and signing up for electronic messages such as email. Examples of signing up for messages include subscribing to a mailing list, purchasing a product or service for which an invoice message will be sent, and signing up for a marketing promotion to receive messages.

A request for authorization may be received (402). One example of requesting authorization is for a document such as a web page or message to embed a request for authorization to send one or more messages. In one example, a request may be made by a script such as a Javascript script or Java applet through a programmatic interface such as ActiveX or a plug-in. In another example, a computer program such as a browser may include the capability to request authorization in response to a request embedded within a document.

Authorization information may be received (403). One example of receiving authorization information is to receive information that will be used in subsequent communications, for example a token or a cryptographically signed digital certificate. Another example of receiving authorization information is to receive a messaging address for which authorization is requested, and/or a key to be used to verify cryptographic signatures on subsequent messages.

Authorization information may be stored (404). In some embodiments, information such as a level of authorization may be associated with stored authorization information. An example of a level of authorization is authorization to send one or more messages. Another example of a level of authorization is delegation of the power to authorize other parties to send one or more messages. In some embodiments, limitation information may be associated with stored authorization information. One example of a limitation is a period of time during which authorization will be in force. Another example of a limitation is a number of messages for which authorization will be in force.

Figure 5:
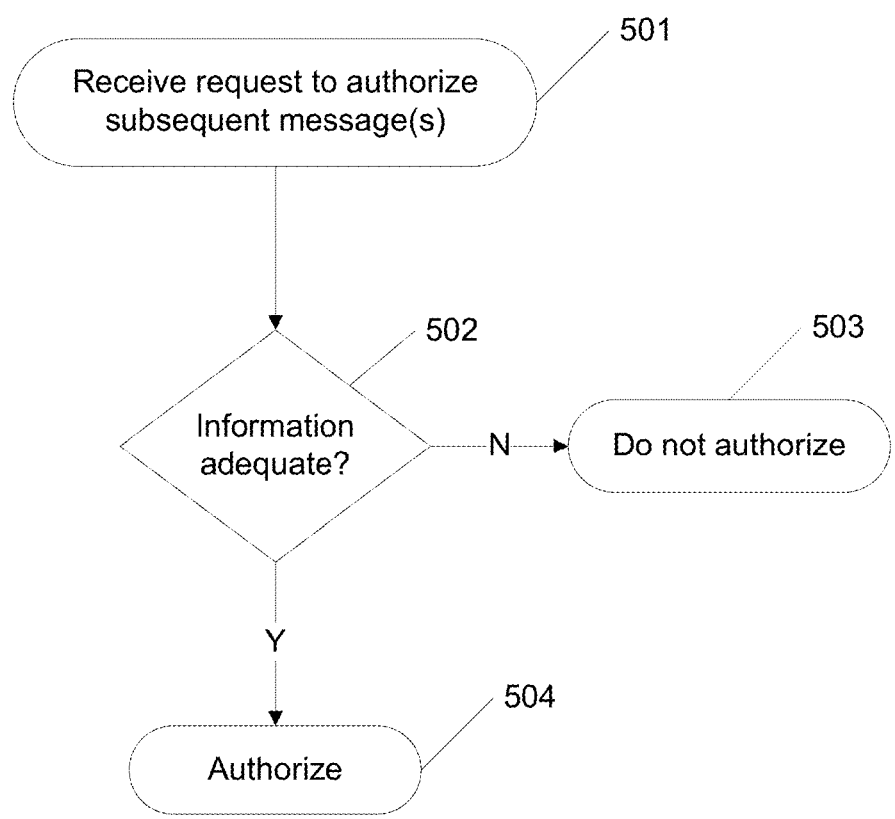
FIG. 5 is a flow diagram of a method for authorizing messages according to some embodiments.

FIG. 5 is a flow diagram of a method for authorizing messages according to some embodiments. In this example, a request for authorization to send one or more subsequent messages is received (501). One example of requesting authorization is for a document such as a web page or message to embed a request for authorization to send one or more messages. For example, a request may be made by code such as Javascript through a programmatic interface such as ActiveX or a plug-in. Another example of requesting authorization is for a requestor to communicate over a network such as network 102 using a communications protocol such as TCP/IP. An example of a situation in which a request could be made is when a user has entered a messaging address on a web site, for example because the user wishes to receive communications from a party such as an e-commerce merchant. In some embodiments, a request for authorization may include an authorization code. An authorization code refers herein to any information that may be used to determine whether a request for authorization is legitimate. One example of an authorization code is a recipient address, for example a messaging address to which message(s) may be sent. Another example of an authorization code is a code entered by a user. Yet another example of an authorization code is a certificate cryptographically signed by, or with a certification chain leading to, a certification authority. In some embodiments, a request for authorization may include identifying information for the requestor. Identifying information refers herein to any information that may be used to identify a party sending a message. One example of identifying information is one or more messaging addresses that may be used to send messages for which authorization is requested. Another example of identifying information for the requestor is one or more cryptographic keys for use in verifying a digital signature. In some embodiments, a requestor may request limited authorization, for example authorization restricted to a specified period of time or a specified number of messages.

Information may be checked to determine whether to grant a request for authorization (502). In some embodiments, information to be checked to determine whether to grant a request for authorization may include information provided with an authorization request, herein referred to as an authorization code. In one example of determining whether an authorization code is adequate, an authorization code may be checked to determine whether it is a valid messaging address for the user. An example of determining whether an address is a valid messaging address for the recipient is to check a for its presence in list of messaging addresses associated with messaging accounts such as email accounts. In another example of determining whether an authorization code is adequate, an authorization code may be checked to determine whether it is a valid digital certificate cryptographically signed by, or with a certification chain leading to, a trusted certification authority. In some embodiments, a certification authority used to determine message authorization may be preconfigured in an operating system, document browser or messaging client. In some embodiments, a certification authority used to determine message authorization may be added or configured by a user or administrator.

In some embodiments, a user interface element such as a dialog box may be presented to allow a user to determine whether to grant authorization, for example by presenting the authorization request to a user and allowing it to be approved or denied. In some embodiments, information to be checked to determine whether to grant a request for authorization may include information about an optional user approval, denial or limitation of authorization, for example received from a user interface element. In some embodiments, authorization may be limited, for example restricted to a specified period of time or a specified number of messages. One example of limiting authorization is to use predetermined or configurable parameters stored in a memory such as a Windows registry. Another example of limiting authorization is to permit a user to configure parameters. Another example of limiting authorization is to use values contained in a certificate.

If the information is not adequate to grant authorization (503), then authorization is not issued in this example. In one example of not issuing authorization, no action is taken in this example. In another example of not issuing authorization, an error message may be presented. If the information is adequate to grant authorization (504), then authorization is issued in this example. In one example of issuing authorization, a sender may be added to a whitelist containing names and/or addresses of senders whose messages are authorized. In another example of issuing authorization, a sender may be added to a whitelist with restrictions, such as a limited period of time during which its presence on a whitelist is valid, or a limited number of messages that are authorized from the sender. In yet another example of issuing authorization, other information provided with an authorization request, such as a cryptographic key for use in verifying a digital signature, a cryptographically signed certificate, or a token to be used in subsequent communications, may be stored. In yet another example of issuing authorization, information such as a certificate or a token may be generated and transmitted to the requestor to be used in subsequent communications.

Figure 6:
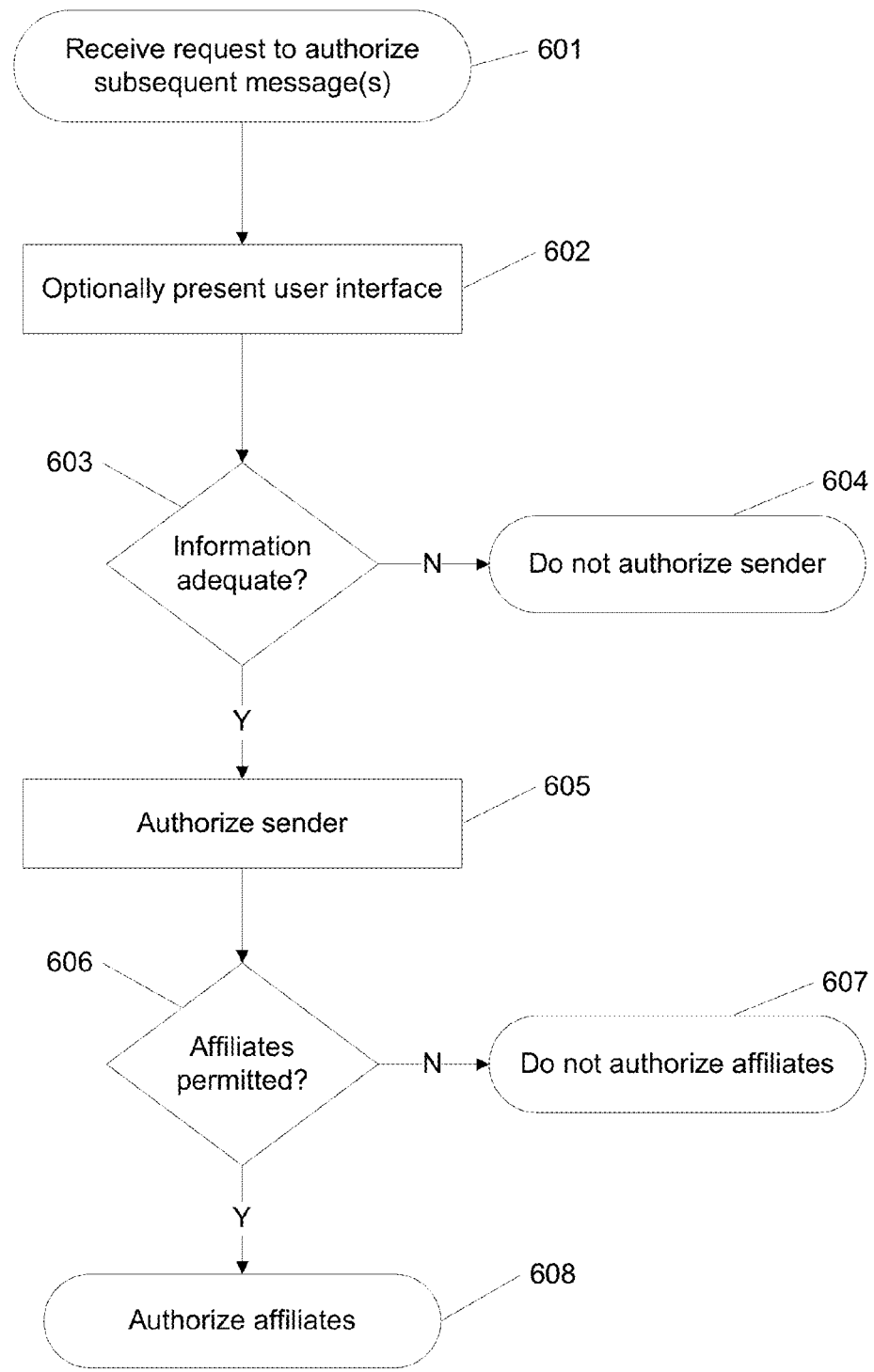
FIG. 6 is a flow diagram of a method for authorizing messages, including affiliate messages, according to some embodiments.

FIG. 6 is a flow diagram of a method for authorizing messages, including affiliate messages, according to some embodiments. In this example, a request to authorize one or more subsequent messages is received (601). One example of requesting authorization is for a document such as a web page or message to embed a request for authorization to send one or more messages. For example, a request may be made by code such as Javascript or Java code through a programmatic interface such as ActiveX or a plug-in. Another example of requesting authorization is for a requestor to communicate over a network such as network 102 using a communications protocol such as TCP/IP. An example of a situation in which a request could be made is when a user has entered a messaging address on a web site, for example because the user wishes to receive communications from a party such as an e-commerce merchant. A request for authorization may include an authorization code. One example of an authorization code is a recipient address, for example a messaging address to which message(s) may be sent. Another example of an authorization code is a code entered by a user. Yet another example of an authorization code is a certificate cryptographically signed by, or with a certification chain leading to, a certification authority. In some embodiments, a request for authorization may include identifying information for the requestor. One example of identifying information for the requestor is one or more messaging addresses that may be used to send messages for which authorization is requested. Another example of identifying information for the requestor is one or more keys for use in verifying digital signatures. In some embodiments, a requestor may request limited authorization, for example authorization restricted to a specified period of time or a specified number of messages.

A user interface element such as a dialog box may optionally be presented (602) to allow a user to determine whether to grant authorization. A user interface may, for example, include details of the type of authorization that is being requested, for example whether authorization is being requested solely for the requestor, or also for affiliates of the requestor. In some embodiments, a user interface may include limitations of authorization, for example a period of time or number of messages during which authorization will remain in force. In some embodiments, a user interface may be presented based on the request being made. An example of presenting a user interface based on the request being made is to present a user interface if affiliate marketing permission is being requested. Another example of presenting a user interface based on the request being made is to present a user interface if a time period exceeds a predetermined threshold, for example one week, or if the number of messages for which authorization is requested exceeds a predetermined threshold, for example ten. In some embodiments, a user may approve a requested authorization, modify authorizations from those requested, or deny authorization altogether.

Information may be checked to determine whether to grant a request for authorization (603). In some embodiments, information to be checked to determine whether to grant a request for authorization may include information provided with an authorization request, herein referred to as an authorization code. In one example of determining whether an authorization code is adequate, an authorization code may be checked to determine whether it is a valid messaging address for the user. An example of determining whether an address is a valid messaging address for the recipient is to check a for its presence in list of messaging addresses associated with messaging accounts such as email accounts. In another example of determining whether an authorization code is adequate, an authorization code may be checked to determine whether it is a valid digital certificate cryptographically signed by, or with a certification chain leading to, a trusted certification authority. In some embodiments, a certification authority used to determine message authorization may be preconfigured in an operating system, document browser or messaging client. In some embodiments, a certification authority used to determine message authorization may be added or configured by a user or administrator.

In some embodiments, information to be checked to determine whether to grant a request for authorization may include information about an optional user approval, denial or limitation of authorization, for example received from a user in 602. In some embodiments, authorization may be limited, for example restricted to a specified period of time or a specified number of messages. One example of limiting authorization is to use predetermined or configurable parameters stored in a memory such as a Windows registry. Another example of limiting authorization is to permit a user to configure parameters (602). Another example of limiting authorization is to use values contained in a certificate.

If information is not adequate to grant authorization (604), then authorization is not issued in this example. In one example of not issuing authorization, no action is taken in this example. In another example of not issuing authorization, an error message may be presented.

If information is adequate to grant authorization (605), then authorization is issued to the sender in this example. In one example of issuing authorization, a sender may be added to a whitelist containing names and/or addresses of senders whose messages are authorized. In another example of issuing authorization, a sender may be added to a whitelist with restrictions, such as a limited period of time during which its presence on a whitelist is valid, or a limited number of messages that are authorized from the sender. In yet another example of issuing authorization, other information provided with an authorization request, such as a cryptographic key for use in a digital signature or a cryptographically signed certificate, may be stored.

In yet another example of issuing authorization, a certificate may be created and signed, certifying that the requestor has authority to send messages to the recipient. In one example of certifying that a requestor has authority to send messages to a recipient, a certificate may be created with messaging addresses for the sender and recipient. In some embodiments, a certificate may be created with an embedded token, for example a randomly generated token, which may be used by a sender in subsequent communications with the recipient. If affiliates are not permitted (606), then affiliates are not authorized in this example (607). An example of not authorizing affiliates is to take no further action. If affiliates are permitted (606), then affiliates are authorized in this example (608). An example of authorizing affiliates is to add the requestor to a list of trusted certification authorities that may be consulted when a message incorporating a certificate is received, to determine whether a message is authorized. Another example of authorizing affiliates is to sign a certificate certifying the requestor as a certification authority. In some embodiments, a certificate certifying the requestor as a certification authority may be transmitted to the requestor for use in future communications.

Figure 7:
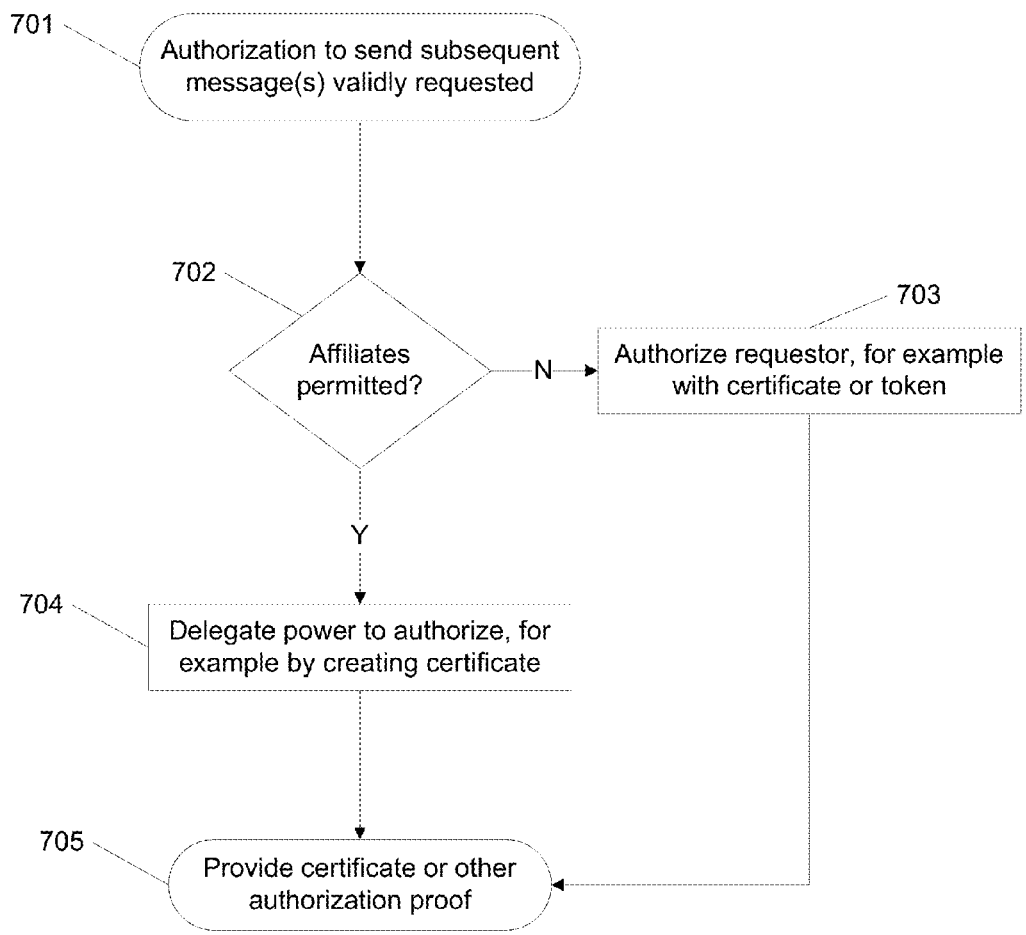
FIG. 7 is a flow diagram of a method for authorizing communications according to some embodiments.

FIG. 7 is a flow diagram of a method for authorizing communications according to some embodiments. In some embodiments, the method of FIG. 7 may be employed as part of a process of granting authorization to send one or more messages, for example as described in conjunction with 504 of FIG. 5 or 605 through 608 of FIG. 6.

In this example, authorization to send one or more messages is validly requested (701). In some embodiments, validation may have been previously performed as described in conjunction with 501 and 502 of FIG. 5, or 601 through 603 of FIG. 6. It is determined whether affiliates are to be permitted (702). One example of determining whether affiliates are to be permitted is to check the authorization request or level of authorization that has been approved.

If affiliates are not permitted, the requestor may be authorized (703). In some embodiments, a certificate such as X.509 certificate may be created and/or signed by the party granting authorization to send, for example a messaging client such as an email client. In some alternate embodiments, alternate methods may be used for authorizing a requestor, for example whitelisting the requestor, or whitelisting a key used to verify subsequent cryptographic signatures from the requestor. In other alternate embodiments, a requestor may be authorized using a token, for example by creating, storing and providing to the requestor a token to be used in subsequent communications, and storing an association between the requestor and token. Authorization proof, for example a certificate or token, may then be provided (705). An example of providing proof is to transmit it to the requestor, for example as described in conjunction with 303 of FIG. 3.

If affiliates are permitted, power to authorize senders may be delegated (704). For example, a certificate may be created including a delegation of the power to authorize sending messages. An example of a certificate with delegation is a certificate signed by the party granting authorization to send, containing an authorization for the requestor to authorize other parties to send messages. Authorization proof, such as a certificate, may then be provided (705). An example of providing proof is to transmit it to the requestor as described in conjunction with 303 of FIG. 3. In some alternate embodiments, the identity of the requestor may be stored as a trusted certification authority. In other alternate embodiments, a certificate provided by the requestor may be stored in a list of trusted certification authorities as discussed in conjunction with FIG. 9.

Figure 8:
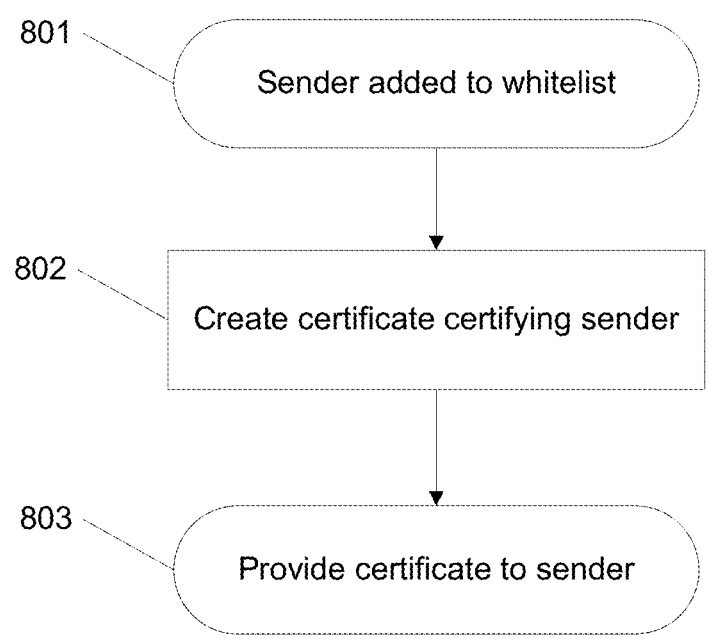
FIG. 8 is a flow diagram of a method for authorizing messages according to some embodiments.

FIG. 8 is a flow diagram of a method for authorizing messages according to some embodiments. In this example, a sender is to be added to a whitelist (801). In some embodiments, a user may request that a sender be added to a whitelist, for example by identifying the sender as a valid correspondent. In some embodiments, a decision to add a sender to a whitelist may be made automatically, for example because a sender has consistently sent non-spam messages.

A digital certificate may be created certifying the sender (802). In some embodiments, the digital certificate may be cryptographically signed, for example using a key associated with the party whitelisting the sender.

The digital certificate may be provided to the sender (803). In some embodiments, the digital certificate may be sent to the sender associated with a message, for example incorporated into a message or available at a location identified in the message. In some embodiments, the digital certificate may be associated with a special field in a message, for example a line in the header fields of an email. In some embodiments, a digital certificate may be transmitted to a sender via out-of-band communications, for example through a TCP/IP connection over a network such as the internet.

Figure 9:
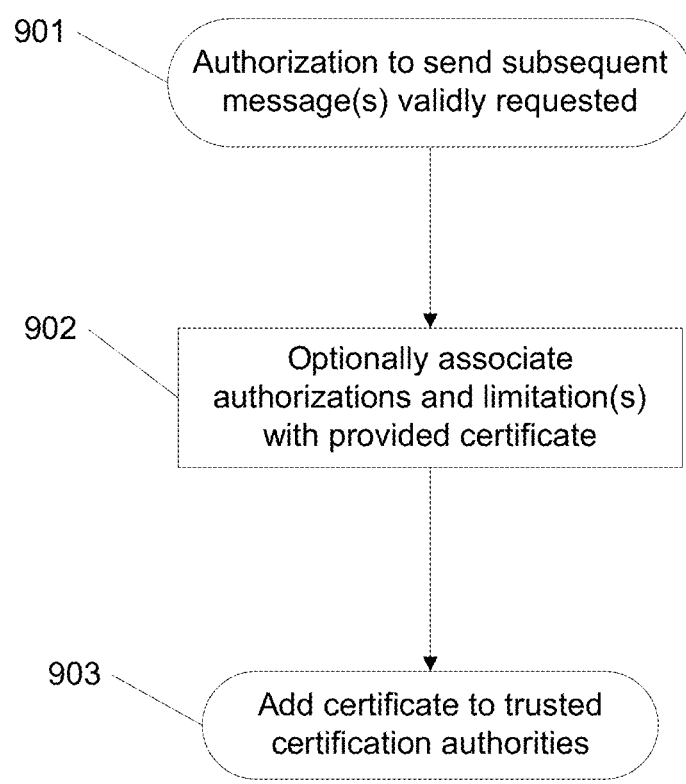
FIG. 9 is a flow diagram of a method for accepting certificates authorizing communications according to some embodiments.

FIG. 9 is a flow diagram of a method for accepting certificates authorizing communications according to some embodiments. In some embodiments, the method of FIG. 9 may be employed as part of a process of granting authorization to send subsequent message(s), for example as described in conjunction with 504 of FIG. 5 or 605 through 608 of FIG. 6. In some embodiments, the method of FIG. 7 may be employed to delegate the power to authorize the sending of subsequent message(s), as discussed in conjunction with 608 of FIG. 6 or 704 through 705 of FIG. 7.

In this example, authorization to send one or more messages is validly requested (901). In some embodiments, validation may have been previously performed as described in conjunction with 501 and 502 of FIG. 5, or 601 through 603 of FIG. 6. In some embodiments, the requestor of authorization may provide a certificate, for example a cryptographically signed certificate such as an X.509 certificate.

One or more authorizations and/or limitations may optionally be associated with, or embedded into, the certificate (902). One example of an authorization is the ability to send messages to the authorizing party. Another example of an authorization is a delegation authorizing the requestor to authorize other parties to send message(s). One example of a limitation is a time period during which an authorization is valid. Another example of a limitation is a number of messages for which an authorization is valid.

The certificate may be stored (903). One example of storing a certificate is to add the certificate to a set of trusted certification authorities with optional associated authorization(s) and/or limitation(s), which may for example be kept in a file such as a database.

Figure 10:
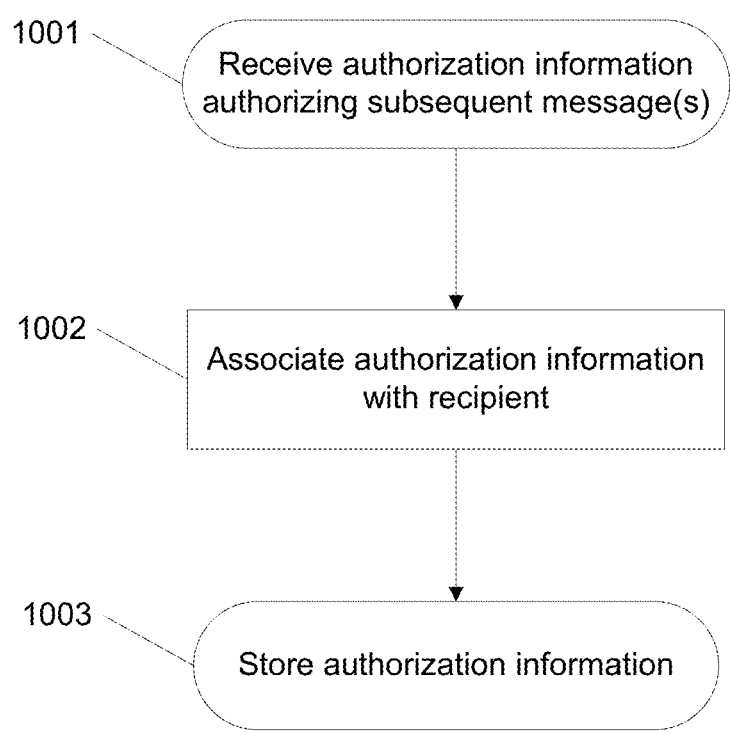
FIG. 10 is a flow diagram of a method for receiving authorization information according to some embodiments.

FIG. 10 is a flow diagram of a method for receiving authorization information according to some embodiments. In this example, authorization information may be received (1001). One example of receiving authorization information is to receive information that will be used in subsequent communications, for example a token or a cryptographically signed digital certificate. In some embodiments, authorization information may be received in, or associated with, a message, for example a message sent as described in conjunction with 803 of FIG. 8. For example, a message may include a field such as a line in the headers of an email message, containing or referring to authorization information. In some embodiments, incoming messages may be filtered to detect messages transmitting authorization information.

Authorization information may be associated with a recipient (1002). An example of associating authorization information with a recipient is to associate authorization information with a messaging address to which the authorization information applies. In some embodiments, authorization information may be associated with the messaging address of the sender of a message associated with the authorization information. In some embodiments, authorization information may be associated with another recipient, for example a recipient specified in a message associated with the authorization information.

Authorization information may be stored (1003). For example, authorization information may be stored in database keyed by the name of a recipient. In some embodiments, when a subsequent message is sent to the recipient, it may include authorization information as described in conjunction with 1502 of FIG. 15.

Figure 11:
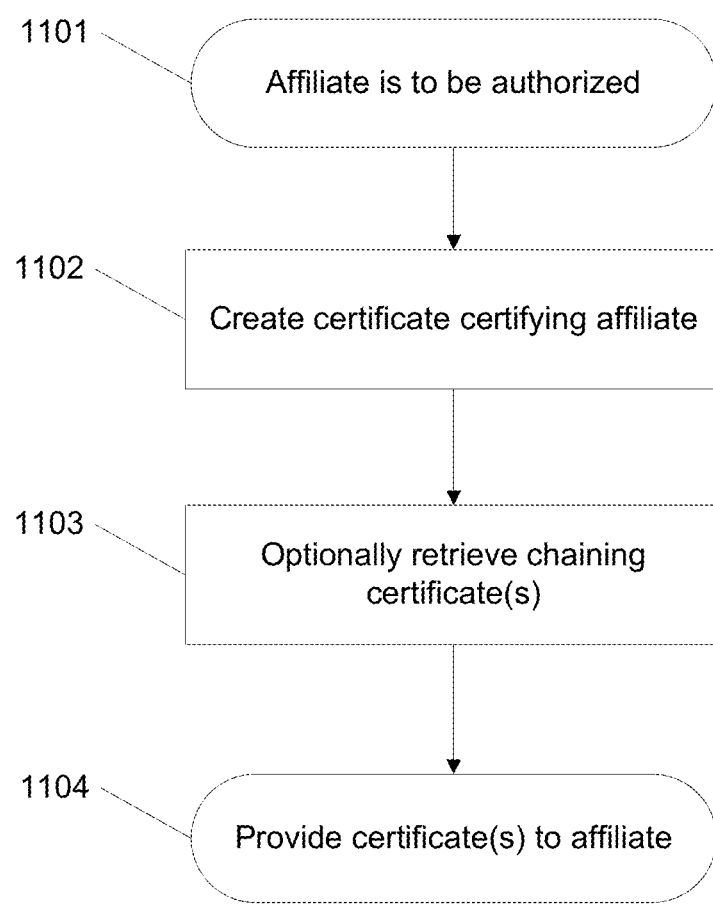
FIG. 11 is a flow diagram of a method for authorizing affiliates according to some embodiments.

FIG. 11 is a flow diagram of a method for authorizing affiliates according to some embodiments. In this example, an affiliate is to be authorized (1101), for example by a party with delegated power to authorize an affiliate. Power to authorize an affiliate may, for example, have been obtained as discussed in conjunction with 608 of FIG. 6 or 704 of FIG. 7. A certificate authorizing an affiliate, herein referred to as an affiliate certificate, may be created (1102). An example of creating an affiliate certificate is to digitally sign a certificate with a cryptographic key, for example using a key that may be verified using a corresponding cryptographic public key. In some embodiments, an affiliate certificate may contain information about an affiliate, for example a cryptographic key that may be used to confirm signatures from the affiliate.

In some embodiments, an affiliate certificate may contain delegated powers. One example of a delegated power is authorization to send a message to a recipient. Another example of a delegated power is the power to authorize another party to send a message to a recipient. In some embodiments, an affiliate certificate may contain limitations. One example of a limitation is a limit on a period of time during which the affiliate certificate may be used. Another example of a limitation is a limit on a number of messages that may be sent using the affiliate certificate.

In some embodiments, one or more chaining certificates may be retrieved (1103). A chaining certificate may be a certificate that demonstrates the delegated power to authorize affiliates. In some embodiments, one or more chaining certificates may be retrieved, to provide a chain of delegations leading to a certification authority that is trusted by the intended message recipient. In alternate embodiments, for example embodiments in which the authorizing party is a trusted certification authority for the intended message recipient, no chaining certificates may be retrieved.

The affiliate certificate may be provided (1104). In some embodiments, one or more chaining certificates may also be provided. One example of providing certificate(s) is to transmit them to an affiliate. Another example of providing certificate(s) is to transmit them to the intended recipient.

Figure 12:
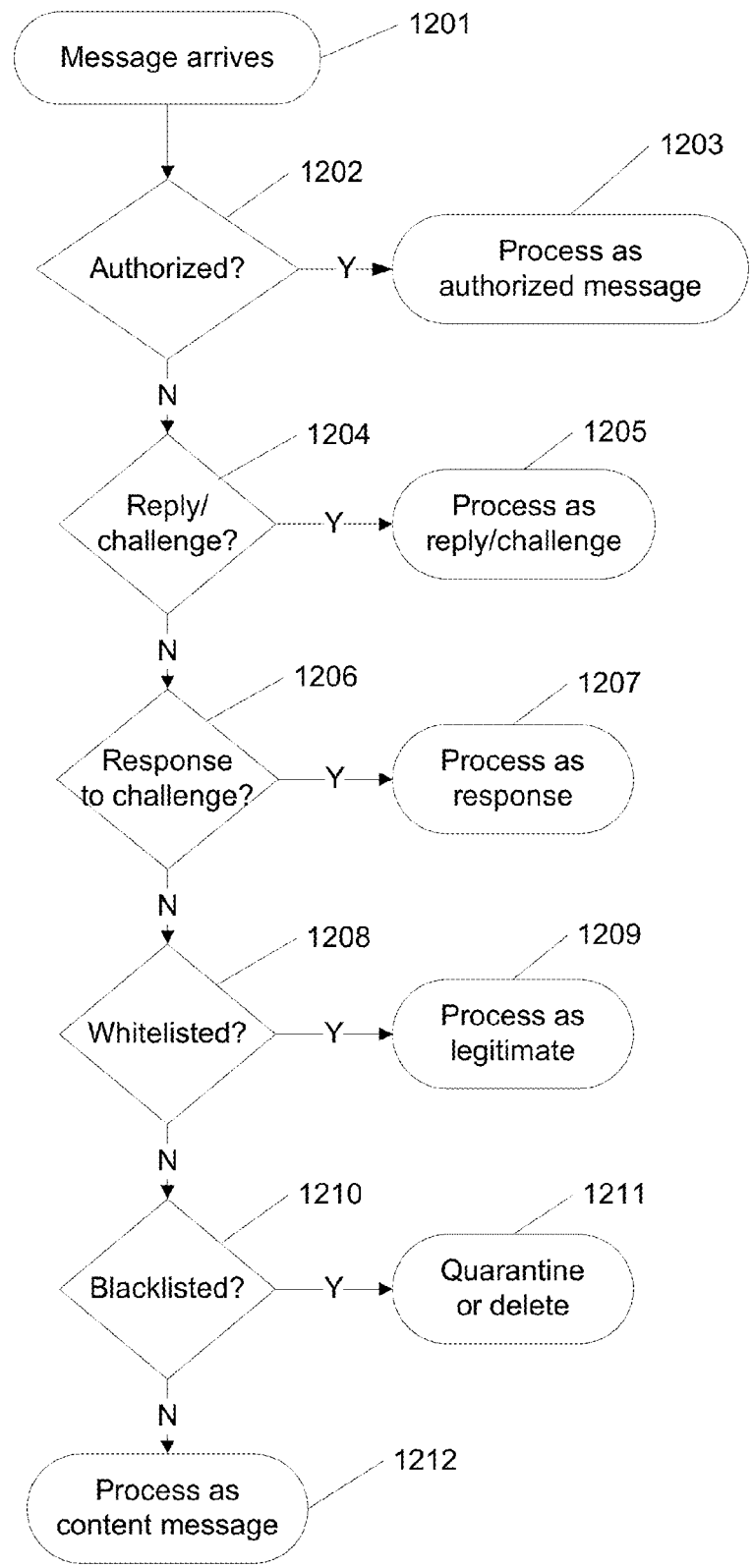
FIG. 12 is a flow diagram of a method for processing an incoming message according to some embodiments.

FIG. 12 is a flow diagram of a method for processing an incoming message according to some embodiments. In this example, a message arrives (1201). Examples of message arrival include when a message is received by a mail transfer agent or other mail server, or by a messaging client or proxy, or is being prepared for possible display by a messaging client. The message may be checked to determine whether it is associated with one or more authorization credentials (1202). A first example of a message associated with authorization credentials is a message that is cryptographically signed by a trusted party. One example of a trusted third party is a party the key to whose signature is stored on a whitelist. Another example of a trusted third party is a party that is predetermined to be trusted, for example in configuration files provided with an operating system, messaging client or anti-spam product. A second example of a message associated with authorization credentials is a message that is cryptographically signed and includes a certificate with a certification chain containing a trusted certification authority. One example of a trusted certification authority is a certification authority that is predetermined to be trusted, for example in configuration files provided with an operating system, messaging client or anti-spam product. Another example of a trusted certification authority is a certification authority that has been added to a list of trusted certification authorities, for example as described in conjunction with 603 of FIG. 6. Yet another example of a trusted certification authority is the recipient of the message, who may for example have signed a certificate as described in conjunction with 605 of FIG. 6.

If the message is associated with authorization credentials (1202), then it is processed as a message associated with authorization credentials in this example (1203). An example of processing as a message associated with authorization credentials is to validate the credentials and bypass spam filtering that might otherwise take place. Another example of processing as a message associated with authorization credentials is to validate the credentials and treat the message preferentially in spam filtering, for example by using a more permissive filtering standard.

A message may be evaluated to determine whether it is a reply to a previous message, including a challenge (1204). An example of determining whether a message is a reply is to detect "In-Reply-To" in an email header. If the message is determined to be a reply, then it is processed as a reply in this example (1205). An example of processing a message as a reply is to compare a message identifier, for example an identifier in an "In-Reply-To" field of an email header, to a list of outgoing message identifiers, and to treat a reply preferentially if a match is found. Another example of processing a message as a reply is to automatically respond to a challenge message.

A message may be evaluated to determine whether it is a response to a challenge (1206). An example of determining whether a message is a response to a challenge is to determine whether one or more predetermined response fields are present in an email header. If the message is a response, then it is processed as a response to a challenge in this example (1207). An example of processing a message as a response to a challenge is to determine whether the response is correct.

A message may be evaluated to determine whether it is whitelisted (1208). One example of determining whether a message is whitelisted is to check a whitelist to determine whether the sender of the message is on a whitelist. Another example of determining whether a message is whitelisted is to check other recipients of a message to determine whether they are on a whitelist. One example of other recipients is recipients on the To: or CC: lines of an email. In some embodiments, a whitelist used for checking recipients may be the same as a whitelist used for checking senders. In other embodiments, separate whitelists may be maintained for checking senders and recipients.

A message may be checked to determine whether it is blacklisted (1210). One example of checking a message to determine whether it is blacklisted is to check the sender address against a list of blacklisted senders. Another example of checking a message to determine whether it is blacklisted is to check the network address, for example the IP address, of a transmitting server such as a mail transfer agent against a list of blacklisted network addresses. If the message is determined to be blacklisted, then it is quarantined or deleted in this example (1211). Otherwise, a message is treated as a content message in this example (1212). An example of treating a message as a content message is to present it to a user. Another example of treating a message as a content message is to evaluate it as potential spam using a content filter such as a Bayesian classifier, support vector machine or heuristic classifier. Yet another example of treating a message as a content message is to challenge it, for example by sending a message to the sender requiring an appropriate response for the original message to be considered legitimate.

Figure 13:
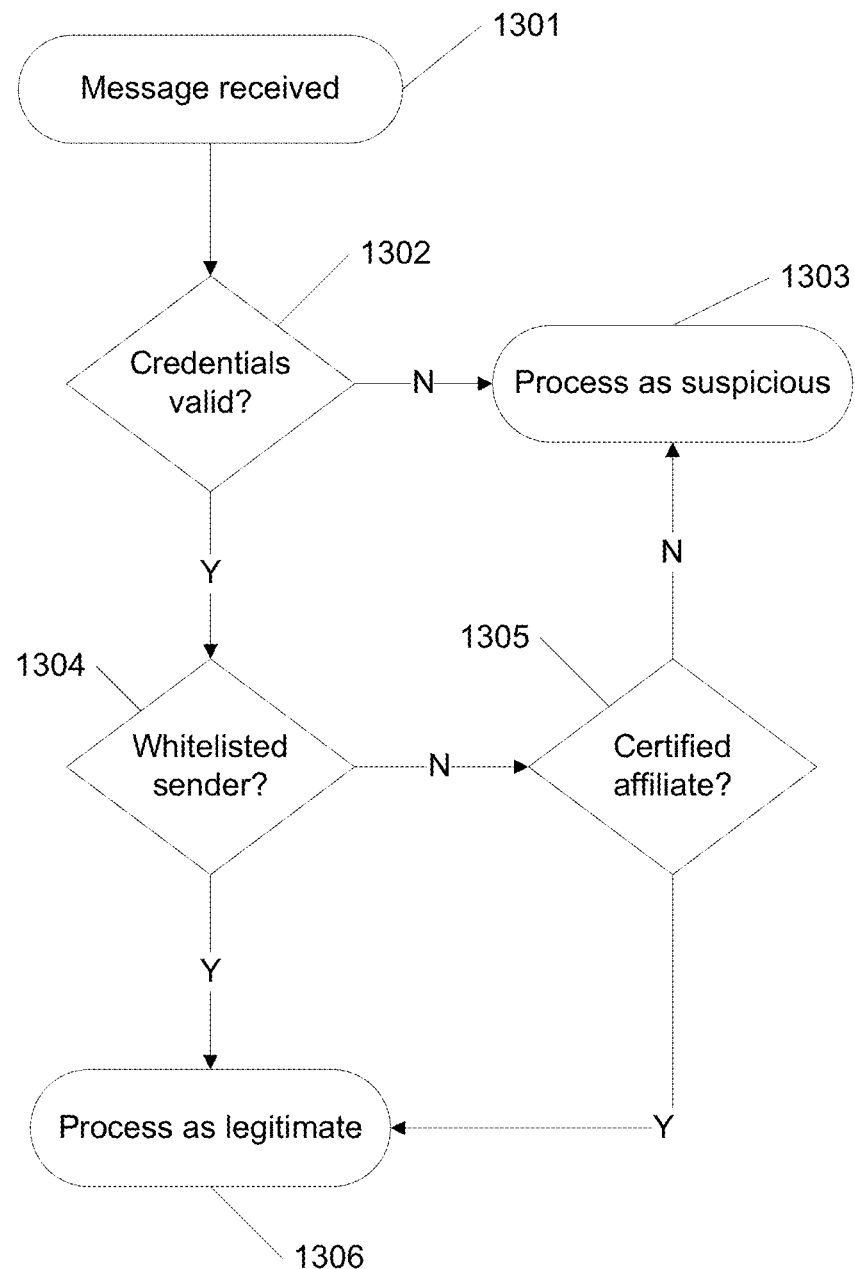
FIG. 13 is a flow diagram of a method for processing a message associated with authorization credentials according to some embodiments.

FIG. 13 is a flow diagram of a method for processing a message associated with authorization credentials according to some embodiments. In this example, a message with one or more associated authorization credentials may be received (1301). This may, for example, have been determined as discussed in conjunction with 1203 of FIG. 12. In other embodiments, any message may be considered a message associated with authorization credentials until determined otherwise. Credentials may be checked to determine whether the message is authorized (1302). An example of checking credentials is to determine whether a cryptographic signature such as an S/MIME signature is correct. In some embodiments, a certification chain associated with a certificate may be checked to determine whether it chains to a trusted certificate authority. Another example of checking credentials is to use a technique that determines or partially determines the reliability of the sender identity, for example Sender ID, SPF or Yahoo! Domain Keys. Yet another example of checking credentials is to determine that an authorization token or cryptographically signed certificate is present. Yet another example of checking credentials is to determine whether a usage limit, for example a limit on the number or frequency of messages, or the period of time during which messages may be accepted, has been exceeded. Techniques for determining whether credentials are valid may be combined. In one example of combining techniques, the presence of an authorization token or a certificate authorizing the sender address may be combined with checking to determine the reliability of the sender identity. In another example of combining techniques, usage limits may be checked in conjunction with any other technique. If credentials are determined not to be valid, then the message may be processed as suspicious (1303). One example of processing a message as suspicious is to quarantine or discard the message. Another example of processing a message as suspicious is to check its contents and/or challenge it to determine whether it may be spam. In some embodiments, a suspicious message may be filtered more stringently than other messages.

An authorized message may be checked to determine if the sender is whitelisted (1304). One example of checking to determine if the sender is whitelisted is to check for the presence of a sender, or a key used to digitally sign the message, in a list of whitelisted senders or cryptographic keys. Another example of checking to determine if the sender is whitelisted is to confirm that a token included in the message matches a token associated with the sender, for example by determining whether the sender and token are contained in a stored list of token authorizations, for example a list of certificates created as described in conjunction with 605 of FIG. 6. In some embodiments, a sender may prove that he or she is whitelisted by including a certificate signed by a trusted certification authority, or with a certification chain originating from a trusted certification authority, certifying that the sender and/or message is legitimate. In some embodiments, a certificate may certify a sender address. In other embodiments, a certificate may certify a key used in a signature, which may be verified to determine whether the sender is whitelisted. If the sender is determined to be whitelisted, then the message may be processed as legitimate (1306). One example of processing a message as legitimate is to deliver it. Another example of processing a message as legitimate is to filter it more leniently than a message that is not considered legitimate, for example by using different settings in a spam filter such as a Bayesian filter.

If the sender has not been determined to be whitelisted, then it may be determined whether the sender is a certified affiliate of an authorized sender or certification authority (1305). An example of this determination is provided in FIG. 14, wherein a determination that a message is legitimate (1405) may be taken to be a determination that the sender is a certified affiliate, and a determination that a message is suspicious (1403) may be taken to be a determination that the sender is not a certified affiliate. If the sender is determined to be a certified affiliate, then the message may be processed as legitimate (1306). If the sender is not determined to be a certified affiliate, then the message may be processed as suspicious (1303).

Figure 14:
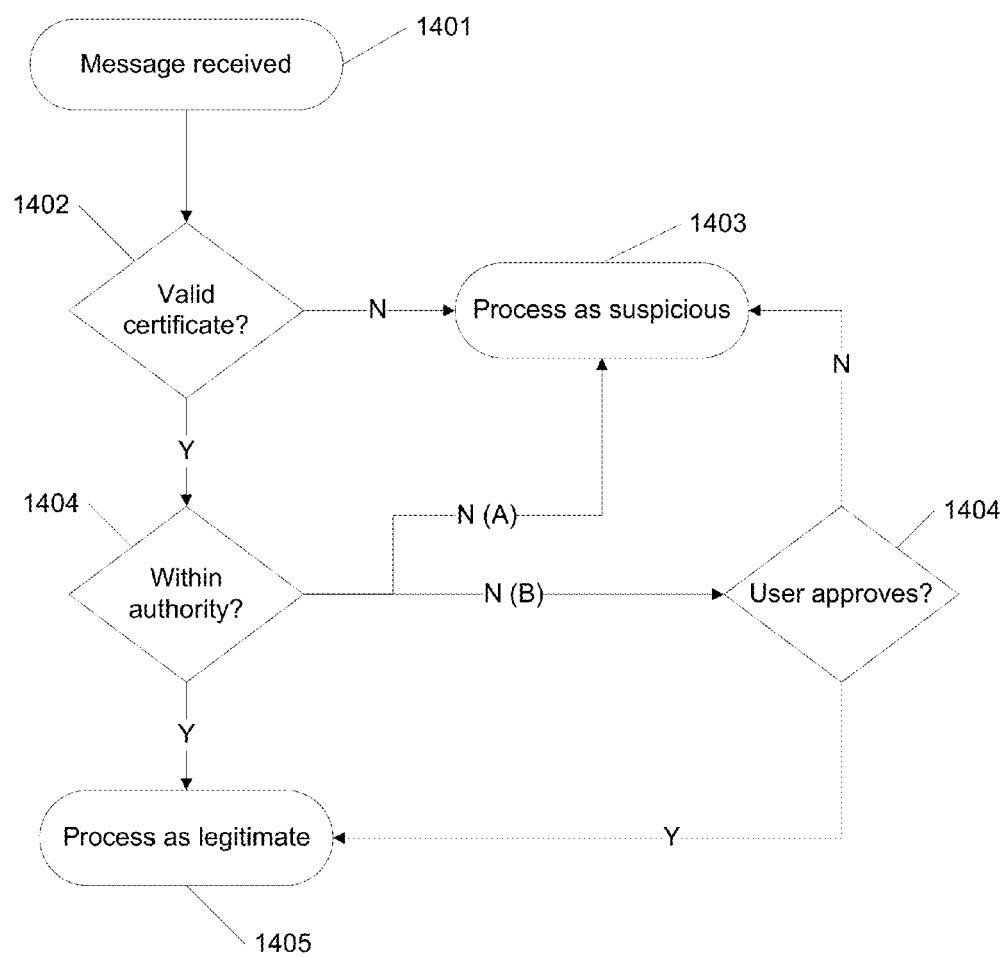
FIG. 14 is a flow diagram of a method for determining whether a message sender is certified according to some embodiments.

FIG. 14 is a flow diagram of a method for determining whether a message sender is certified according to some embodiments. In this example, a message is to be checked (1401). In some embodiments, a message may be checked when a message is received. In some embodiments, a message may be checked when a message is determined to be associated with authorization credentials, for example as shown in 1203 of FIG. 12. In some embodiments, a message may be checked to determine whether a message was sent by a certified affiliate, for example as shown in 1305 of FIG. 13.

The presence of a valid certificate in or associated with the message may be determined (1402). For example, a certificate such as an X.509 certificate may be checked to determine whether it is signed by, or has a certification chain leading to, a trusted certification authority. An example of determining whether a certification authority is trusted is to determine whether the authority is contained in a list of trusted certification authorities. In some embodiments, one or more certification authorities used to determine message authorization may be preconfigured in an operating system, document browser or messaging client. In some embodiments, a certification authority used to determine message authorization may be added or configured by a user or administrator. In some embodiments, the recipient may be a trusted certification authority. In some embodiments, a certificate may be considered valid only if it is determined that the message is cryptographically signed using a signature whose key is certified by the certificate. In other embodiments, a message need not be signed for a certificate to be considered valid.

If the message does not have a valid certificate, then the message is processed as suspicious in this example (1403). One example of processing a message as suspicious is to quarantine or discard the message. Another example of processing a message as suspicious is to check its contents and/or challenge it to determine whether it may be spam. In some embodiments, a suspicious message may be filtered more stringently than other messages. Yet another example of processing a message as suspicious is to report that it was not certified properly, for example in embodiments in which the method of FIG. 14 is performed in conjunction with 1305 of FIG. 13.

If the message has a valid certificate, then the level of authority of the certificate and/or one or more certifying parties may be checked (1404). One example of checking the level of authority is to determine whether the immediately certifying party (i.e. the party that signed the certificate) has permission to certify a sender, for example by checking whether the certifying party is contained in a list of trusted certification authorities, or by checking specific authorizations that have been granted to the certifying party in a list of trusted certification authorities. Another example of checking the level of authority is to determine whether a certifying party further up a certification chain has permission to certify a sender, for example by checking whether a party is contained in a list of trusted certification authorities, or by checking specific authorizations that have been granted to a certifying party. In some embodiments, checking the level of authority may be performed from the immediately certifying party up the certificate chain, stopping when a party with the authority to certify the sender is found. In some embodiments, a certifying party may be authorized to certify only certain senders, for example senders in the same organization; or may be authorized to certify any senders.

Another example of checking the level of authority is to determine whether a certificate has been revoked, for example by consulting a list of revoked certificates. Yet another example of checking the level of authority is to determine whether a usage limit has been exceeded. One example of a usage limit is a number of messages that have been authorized to have been sent using the certificate. Another example of a usage limit is a limit on a period of time during which messages are authorized to be sent using the certificate. In some embodiments, usage limits may be contained within certificates. In some embodiments, usage limits may be associated with stored certificates. In some embodiments, a whitelist may be implemented by issuing certificates that may be included in messages, for example certificates signed by the recipient of the messages. In some embodiments, affiliate marketing programs may be authorized using certificates, which may for example have been granted as shown in 608 of FIG. 6, or may for example have been preconfigured in software such as an operating system, messaging client or browser client.

If the level of authority is adequate for the certification of the message, then the message may be processed as legitimate in this example (1405). One example of processing a message as legitimate is to deliver the message. Another example of processing a message as legitimate is to filter the message less stringently than other messages. Yet another example of processing a message as legitimate is to report that it was certified properly, for example in embodiments in which the method of FIG. 14 is performed in conjunction with 1305 of FIG. 13.

If the level of authority (1404) is not adequate for the certification of the message, then the message may be processed as suspicious (1403) in some embodiments. In other embodiments, a user interface element may be presented (1404). An example of presenting a user interface element is to present an element such as a dialog box in which the opportunity is offered to approve or deny the message. An element may optionally include information such as the identity of the certifying party. In some embodiments, options may be provided to renew, increase, revoke and/or decrease the authority of the certifying party. If the message is approved, then the message is processed as legitimate in this example (1405). If the message is not approved, then the message is processed as suspicious in this example (1403).

Figure 15:
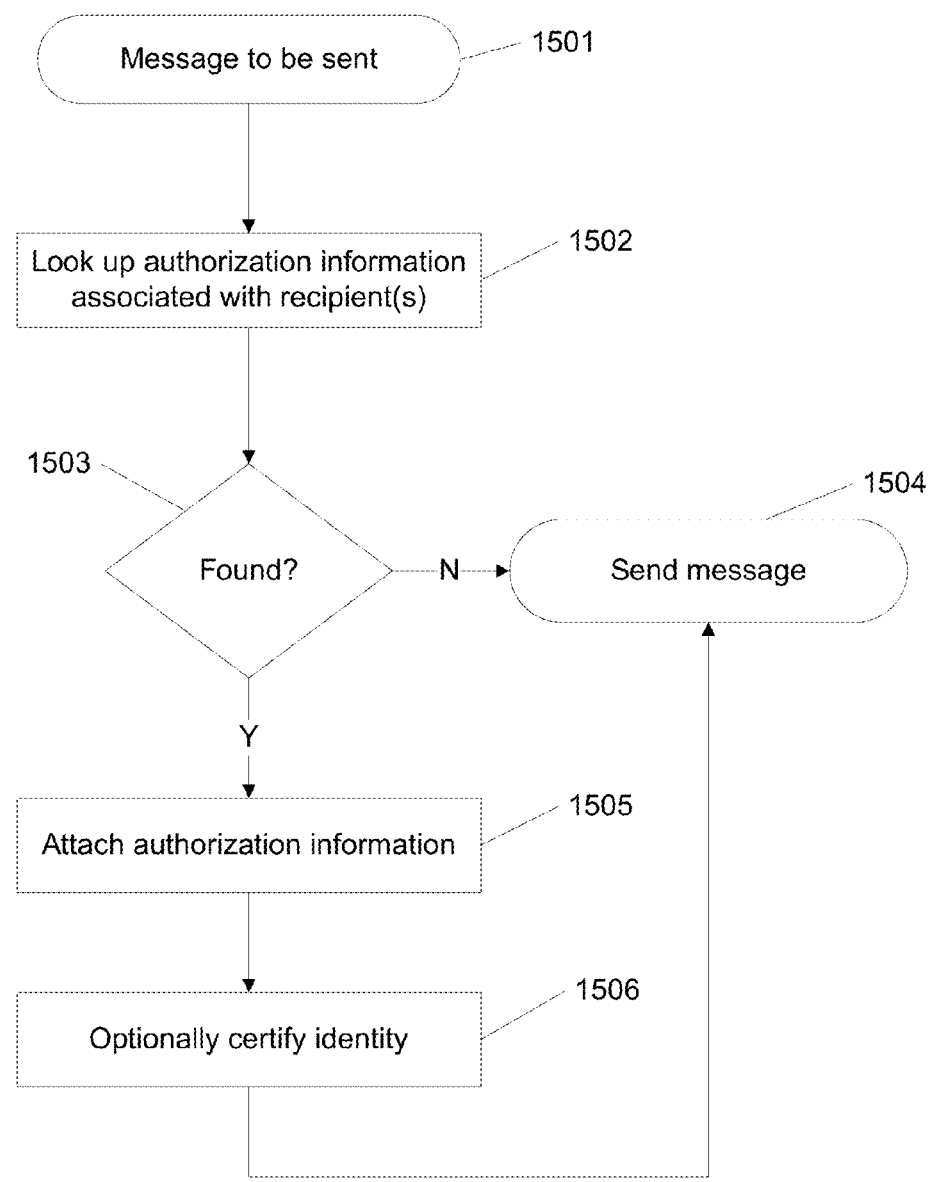
FIG. 15 is a flow diagram of a method for sending messages with associated authorization information according to some embodiments.

FIG. 15 is a flow diagram of a method for sending messages with associated authorization information according to some embodiments. In this example, a message is ready to be sent (1501). One example of a message being ready to be sent is that a user has composed a message and directed a messaging client to send the message. Another example of a message being ready to be sent is that a message has been composed by an automatic message sender, for example a mailer sending to a mailing list.

Authorization information associated with one or more recipients may be looked up (1502). One example of looking up authorization information is to check storage such as a memory, file or database to determine whether there is authorization information associated with a recipient. One example of authorization information is a cryptographically signed digital certificate, which may for example have been received from a certification authority or from a user authorization as discussed in conjunction with 605 or 608 of FIG. 6. Another example of authorization information is an authentication token, which may for example have been received as discussed in conjunction with 605 of FIG. 6.

If authorization information associated with one or more recipients is not found (1503), then the message may be sent (1504). For example, the message may be passed along to the normal message-sending components, such as a mail server or instant messaging server. If authorization information associated with one or more recipients is found, then authorization information may be attached to, or otherwise associated with, the message (1505). One example of attaching information is to include it in the header or body of a message, for example the headers of an email. Another example of attaching information is to structurally separate it, for example in a MIME attachment.

The identity of the sender may optionally be certified (1506). One example of certifying identity is to cryptographically sign the message, for example using an S/MIME signature. Another example of certifying identity is to send a message through a trusted server, for example a server that may be externally verified to be associated with the sender. One example of a server that may be externally verified to be associated with the sender is a server that affixes a domain-level signature to outgoing messages, for example using Yahoo! Domain Keys. Another example of a server that may be externally verified to be associated with the sender is a server whose address is authorized by the sender, for example via Sender-ID or SPF. The message may be sent (1504).

Figure 16:
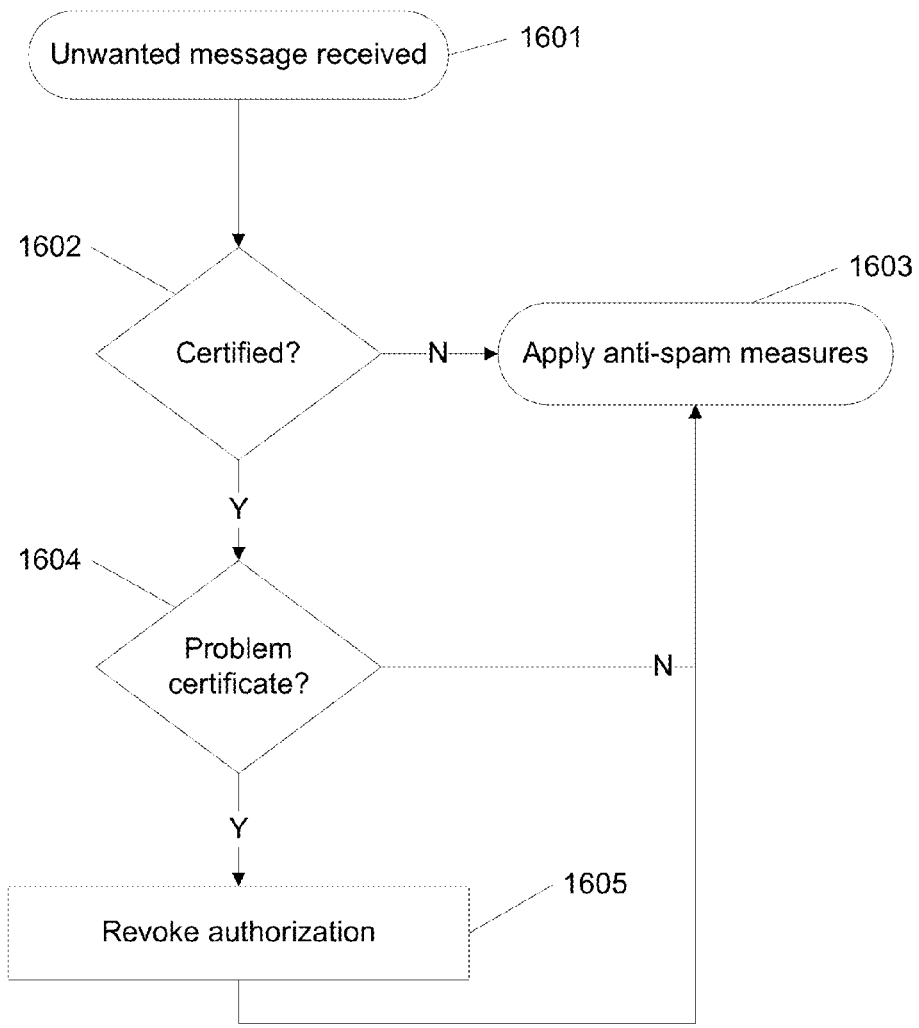
FIG. 16 is a flow diagram of a method for revoking authorization to send messages and/or certify message senders according to some embodiments.

FIG. 16 is a flow diagram of a method for revoking authorization to send messages and/or certify message senders according to some embodiments. In this example, an unwanted message is received (1601). One example of an unwanted message is a message a user has identified as unwanted, for example by selecting a user interface element used to identify spam. Another example of an unwanted message is a message that has been determined by an anti-spam component such as a text classifier or a challenge/response component as spam. The message may be checked to determine whether it incorporated or was otherwise associated with an authorization certificate (1602).

If the message was not certified, then one or more anti-spam measures are applied to the message in this example (1603). One example of an anti-spam measure is to remove the sender from a whitelist (for example, a name-based whitelist or a whitelist of cryptographic keys used in signatures that are accepted for authorization). Another example of an anti-spam measure is to train a text classifier such as a Bayesian text classifier or support vector machine using the message as an example of spam. Yet another example of an anti-spam measure is to delete the message.

If the message was certified (1602), an optional user interface element, for example a dialog box, may be presented in some embodiments. An element may optionally include information such as the identity of the certifying party. In some embodiments, options may be provided to revoke and/or decrease the authority of a certifying party, for example the certifying party whose authority was relied on to allow the message to be received. In some embodiments, an optional user interface element may be presented before an optional determination of whether a certificate is problematic (1604). In some embodiments, an optional user interface element may be presented after an optional determination of whether a certificate is problematic (1604).

The certificate incorporated in the message may optionally be examined to determine whether it is problematic (1604). For example, negative reports (for example as described in conjunction with 1601) may be associated with a certificate. In some embodiments, when the number of negative reports exceeds a threshold, for example five, the certificate may be revoked (1605). In some embodiments, positive reports, optionally including implicit positive reports such as a user reading a message certified using a certificate without reporting it, may also be taken into account in determining whether a certificate is problematic.

For example, a certificate may be revoked if the ratio of negative reports to positive reports exceeds a threshold percentage of total messages that the certificate has authorized, for example five percent. In some embodiments, all history may be used to determine the percentage of negative messages that a certificate has authorized. In some embodiments, only recent history (for example within one month) may be used to determine the percentage of negative messages that a certificate has authorized. If a certificate is determined not to be problematic, then anti-spam measures may be applied (1603).

Authorization may be revoked (1605). One example of revoking authorization is to remove a certificate authority from the set of trusted certificate authorities. One example of removing a certificate authority is to remove the certificate authority that created the certificate. Another example of removing a certificate authority is to remove the certificate authority whose authority was relied on to allow the message to be received, for example the lowest certificate authority in the certificate chain with adequate authority. Another example of revoking authorization is to place the certificate on a list of revoked certificates. In some embodiments, a list of revoked certificates may be stored, for example in a file such as a database. In some embodiments, a list of revoked certificates may be stored in a network-accessible location, which for example may be consulted by parties wishing to determine whether a certificate may be revoked. Yet another example of revoking authorization is to alter authorization(s) associated with a certificate. For example, authorization to send messages may be retained while authorization to authorize other senders may be revoked.

Anti-spam measures may be applied (1603).

In some embodiments, revoking authorization to certify message senders as discussed in conjunction with FIG. 16 may be used to revoke affiliate marketing permissions, for example when a party for whom affiliate marketing has been approved has authorized affiliates to send spam or other unwanted messages.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
   at a computing device associated with a message recipient, receiving a request for the message recipient to authorize delivery of a message for the message recipient to be sent subsequent to the request, by a specified sender, via an electronic network, wherein the request for the message recipient to authorize delivery of the message to be sent subsequent to the request is embedded in a web page associated with the specified sender and wherein the request includes an authorization code, wherein the authorization code has been entered by a user on the web site associated with the specified sender, and wherein the authorization code is a messaging address, and wherein determining whether the request is valid includes determining whether the messaging address is a valid messaging address for the message recipient;
   executing program instructions to determine whether the request is valid;
   updating information associated with the specified sender to indicate that the specified sender is authorized, when it is determined that the request is valid;
   receiving an incoming message for the message recipient via the electronic network, wherein receiving the incoming message for the message recipient via the electronic network occurs after updating the information associated with the specified sender and after receiving the request for the message recipient to authorize delivery of the message to be sent subsequent to the request;
   determining that the specified sender is a sender of the incoming message;
   determining whether the specified sender is authorized, wherein determining whether the specified sender is authorized includes checking the information associated with the specified sender, and determining that the information associated with the specified sender indicates that the specified sender is authorized; and
   when it is determined that the second sender is authorized, bypassing spam filtering for the incoming message and delivering the incoming message.

2. The method of claim 1, wherein the incoming message is an email message.

3. The method of claim 1, wherein determining whether the request is valid includes presenting a user interface element, wherein the user interface element includes an option to approve the request.

4. The method of claim 1, wherein authorizing a subsequent message includes a limitation, wherein the limitation includes at least one of a time limit and a limit on the number of subsequent authorized messages.

5. The method of claim 1, wherein the information associated with the specified sender is a whitelist.

6. The method of claim 1, wherein the information associated with the specified sender is a digital certificate.

7. The method of claim 1, wherein bypassing spam filtering for the incoming message includes applying first spam filtering to the incoming message, wherein the first spam filtering is less stringent than second spam filtering that would be applied to a message from an unauthorized sender.

8. A system, comprising:
   a processor configured to:
      receive a request for the message recipient to authorize delivery of a message for a message recipient to be sent subsequent to the request, by a specified sender, via an electronic network, wherein the request for the message recipient to authorize delivery of the message to be sent subsequent to the request is embedded in a web page associated with the specified sender and wherein the request includes an authorization code, wherein the authorization code has been entered by a user on the web site associated with the specified sender, and wherein the authorization code is a messaging address, and wherein determining whether the request is valid includes determining whether the messaging address is a valid messaging address for the message recipient;
      determine whether the request is valid;
      update information associated with the specified sender to indicate that the specified sender is authorized, when it is determined that the request is valid;
      receive an incoming message for the message recipient via the electronic network, wherein receiving the incoming message for the message recipient via the electronic network occurs after updating the information associated with the specified sender and after receiving the request for the message recipient to authorize delivery of the message to be sent subsequent to the request;
      determine that the specified sender is a sender of the incoming message;
      determine whether the specified sender is authorized, wherein determining whether the specified sender is authorized includes checking the information associated with the specified sender, and determining that the information associated with the specified sender indicates that the specified sender is authorized; and when it is determined that the second sender is authorized, bypass spam filtering for the incoming message and delivering the incoming message; and a memory coupled with the processor, wherein the memory provides instructions to the processor.

9. The system of claim 8, wherein determining whether the request is valid includes presenting a user interface element, wherein the user interface element includes an option to approve the request.

10. The system of claim 8, wherein the information associated with the specified sender is a whitelist.

11. The system of claim 8, wherein bypassing spam filtering for the incoming message includes applying first spam filtering to the incoming message, wherein the first spam filtering is less stringent than second spam filtering that would be applied to a message from an unauthorized sender.

12. The system of claim 8, wherein the incoming message is an email message.

13. The system of claim 8, wherein authorizing a subsequent message includes a limitation, wherein the limitation includes at least one of a time limit and a limit on the number of subsequent authorized messages.

14. The system of claim 8, wherein the information associated with the specified sender is a digital certificate.

15. A computer program product for processing a message, the computer program product being embodied in a non-transitory computer readable medium and comprising computer instructions for:

receiving a request for the message recipient to authorize delivery of a message for a message recipient to be sent subsequent to the request, by a specified sender, via an electronic network, wherein the request for the message recipient to authorize delivery of the message to be sent subsequent to the request is embedded in a web page associated with the specified sender and wherein the request includes an authorization code, wherein the authorization code has been entered by a user on the web site associated with the specified sender, and wherein the authorization code is a messaging address, and wherein determining whether the request is valid includes determining whether the messaging address is a valid messaging address for the message recipient;

executing program instructions to determine whether the request is valid;

updating information associated with the specified sender to indicate that the specified sender is authorized, when it is determined that the request is valid;

receiving an incoming message for the message recipient via the electronic network, wherein receiving the incoming message for the message recipient via the electronic network occurs after updating the information associated with the specified sender and after receiving the request for the message recipient to authorize delivery of the message to be sent subsequent to the request;

determining that the specified sender is a sender of the incoming message;

determining whether the specified sender is authorized, wherein determining whether the specified sender is authorized includes checking the information associated with the specified sender, and determining that the information associated with the specified sender indicates that the specified sender is authorized; and when it is determined that the second sender is authorized, bypassing spam filtering for the incoming message and delivering the incoming message.

16. The computer program product of claim 15, wherein determining whether the request is valid includes presenting a user interface element, wherein the user interface element includes an option to approve the request.

17. The computer program product of claim 15, wherein the information associated with the specified sender is a whitelist.

18. The computer program product of claim 15, wherein authorizing a subsequent message includes a limitation, wherein the limitation includes at least one of a time limit and a limit on the number of subsequent authorized messages.

19. The computer program product of claim 15, wherein the information associated with the specified sender is a digital certificate.

20. The computer program product of claim 15, wherein bypassing spam filtering for the incoming message includes applying first spam filtering to the incoming message, wherein the first spam filtering is less stringent than second spam filtering that would be applied to a message from an unauthorized sender.

* * * * *